(12) United States Patent
Li

(10) Patent No.: US 11,456,694 B2
(45) Date of Patent: Sep. 27, 2022

(54) METHOD BASED ON MOTOR STALL PROTECTION AND MOTOR STALL PROTECTION APPARATUS

(71) Applicant: AUTOCHIPS WUHAN CO., LTD., Wuhan (CN)

(72) Inventor: Liangtao Li, Hefei (CN)

(73) Assignee: AUTOCHIPS WUHAN CO., LTD., Wuhan (CN)

(*) Notice: Subject to any disclaimer, the term of this patent is extended or adjusted under 35 U.S.C. 154(b) by 156 days.

(21) Appl. No.: 16/926,652

(22) Filed: Jul. 11, 2020

(65) Prior Publication Data
US 2021/0184621 A1 Jun. 17, 2021

(30) Foreign Application Priority Data
Dec. 11, 2019 (CN) .......................... 201911266564.9

(51) Int. Cl.
*H02P 29/032* (2016.01)
*H02P 6/17* (2016.01)
*H02P 29/68* (2016.01)
*H02P 6/28* (2016.01)

(52) U.S. Cl.
CPC .............. *H02P 29/032* (2016.02); *H02P 6/17* (2016.02); *H02P 6/28* (2016.02); *H02P 29/68* (2016.02); *H02P 2205/01* (2013.01); *H02P 2205/07* (2013.01)

(58) Field of Classification Search
CPC .. H02P 29/032; H02P 6/17; H02P 6/28; H02P 29/68; H02P 2205/01; H02P 2205/07; H02P 29/028; H02P 29/024; H02P 29/02; H02H 7/0851; B60L 3/06
See application file for complete search history.

(56) References Cited

U.S. PATENT DOCUMENTS 5,934,398 A * 8/1999 Hotta .................. B60L 15/2009
 318/434
7,612,513 B2 * 11/2009 Ando .................. H02H 7/0833
 318/434

(Continued)

FOREIGN PATENT DOCUMENTS

| CA | 2657624 A1 * | 2/2008 | ............. H02H 7/093 |
| CN | 110165971 A * | 8/2019 | ............. H02P 29/024 |
| CN | 110265974 A * | 9/2019 | ............. G01K 13/00 |

*Primary Examiner* — Bickey Dhakal

(57) ABSTRACT

The present disclosure provides a method based on a motor stall protection and a motor stall protection apparatus. The method may includes: obtaining a rotational speed of a motor rotor and an output current of a motor stator; performing a pre-stall protection in response to the rotational speed being less than a first rotational speed threshold and the output current being greater than a first current threshold, the performing a pre-stall protection comprises obtaining a power module temperature, a stall decision value and a first current accumulation value; performing the stall protection in response to the first current accumulation value obtained being greater than the stall decision value. The method based on the motor stall protection provided in the present disclosure may determine a timing of performing the stall protection by periodically comparing the first current accumulation value and the stall decision value.

19 Claims, 6 Drawing Sheets

(56) References Cited

U.S. PATENT DOCUMENTS

| | | | | |
|---|---|---|---|---|
| 8,941,343 B2* | 1/2015 | Lipp | ............... | H02H 7/093 |
| | | | | 318/434 |
| 9,481,254 B1* | 11/2016 | Schulz | ............... | B60L 15/2045 |
| 2018/0079311 A1* | 3/2018 | Ichikawa | ............... | B60L 3/12 |
| 2019/0393824 A1* | 12/2019 | Osugi | ............... | H02P 21/0003 |

* cited by examiner

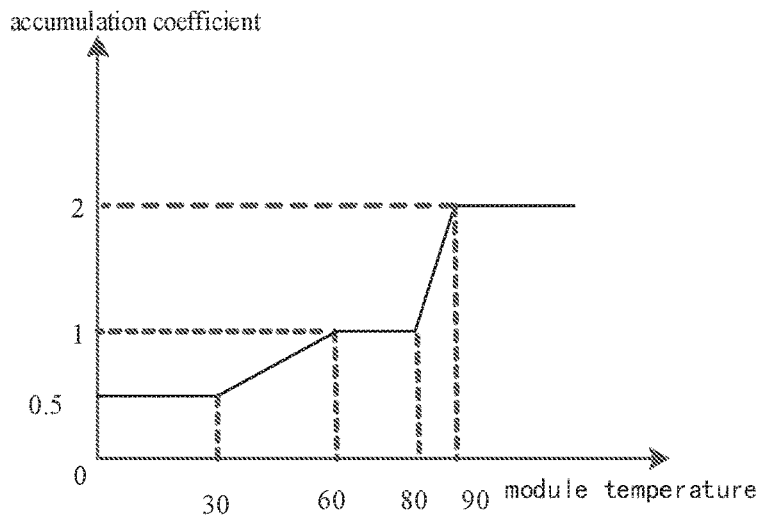

Fig. 4

```
┌─────────────────────────────────────────────────────────────┐
│ the stall protection coefficient may be obtained to produce │
│ a maximum output current magnitude of the motor, the        │──S501
│ maximum output current magnitude = the stall protection     │
│ coefficient*the peak current.                               │
└─────────────────────────────────────────────────────────────┘
                              ⇓
┌─────────────────────────────────────────────────────────────┐
│ the stall protection coefficient may change from 1 to 0     │──S502
│ within the first preset time threshold                      │
└─────────────────────────────────────────────────────────────┘
```

Fig. 5

```
┌─────────────────────────────────────────────────────────────┐
│ the rotational speed of the motor rotor and the output      │──S601
│ current of the motor stator may be obtained                 │
└─────────────────────────────────────────────────────────────┘
                              ⇓
┌─────────────────────────────────────────────────────────────┐
│ if the rotational speed is greater than the second          │
│ rotational speed threshold, or the output current is less   │──S602
│ than the second current threshold, then the second          │
│ current accumulated value may be obtained                   │
└─────────────────────────────────────────────────────────────┘
                              ⇓
┌─────────────────────────────────────────────────────────────┐
│ if the second current accumulated value obtained is less    │
│ than 0, then the pre-stall protection or the stall          │──S603
│ protection may be terminated                                │
└─────────────────────────────────────────────────────────────┘
```

Fig. 6

| if the rotational speed of the motor rotor is less than the second rotational speed threshold, or if the output current of the motor stator is less than the second current threshold | S801 |

↓

| the switching frequency of the power module may be restored to a normal switching frequency | S802 |

↓

| the stall protection coefficient may restore to 1 within the second preset time | S803 |

METHOD BASED ON MOTOR STALL PROTECTION AND MOTOR STALL PROTECTION APPARATUS

CROSS REFERENCE TO RELATED APPLICATION

The present disclosure claims priority to Chinese Patent Application No. 201911266564.9 entitled "METHOD AND SYSTEM BASED ON MOTOR STALL PROTECTION, AND READABLE STORAGE MEDIUM" filed on Dec. 11, 2019, the contents of which are incorporated by reference in their entirety herein.

TECHNICAL FIELD

The present disclosure relates to a field of motor control, and in particularly relates to a method based on a motor stall protection and a motor stall protection apparatus.

BACKGROUND

Motor stall means that the motor still outputs a large torque at a zero or very low rotational speed, which would cause temperature of a power module to rise too rapidly and would eventually cause a damage or burn-out of the motor.

Stall protection is a kind of protection unique to the motor. During an operation of the motor, if the motor stalls due to excessive load or mechanical reasons, the motor may be allowed to run for a short term depending on various overload capacities of the motor. But if the malfunction could not be eliminated in time, the motor may be caused to be overheated and damaged or burnt-out.

In the related art, when the motor stall is detected, then the stall protection would be performed after a preset fixed time. However, the preset fixed time could not ensure the accuracy of performing the stall protection. For example, if the preset fixed time is too long, the motor may be damaged or burn-out before performing the stall protection. If the preset fixed time is too short, time before the stall protection may not be fully utilized.

SUMMARY OF THE DISCLOSURE

The technical problem to be solved by the present disclosure is to provide a method based on motor stall protection, a system and a readable storage medium, to solve the above-mentioned defect of performing the stall protection after a preset fixed time.

In some embodiments of the present disclosure, a method based on the motor stall protection is provided. The method may include obtaining a rotational speed of a motor rotor and an output current of a motor stator. If the rotational speed is less than the first rotational speed threshold, and the output current is greater than the first current threshold, then performing the pre-stall protection. That is, obtaining a power module temperature, a stall decision value and a first current accumulation value. If the first current accumulation value obtained is greater than the stall decision value, then performing the stall protection. The output current may periodically accumulate a first step length to obtain the first current accumulation value. The stall decision value may decrease as the power module temperature rises. The first step length may increase as the power module temperature rises.

In some embodiments of the present disclosure, a motor is further provided. The motor may include a stator, a rotor, a position sensor and a current sensor. The position sensor may be connected with the rotor to obtain the rotational speed of the rotor. The current sensor may be connected to the stator to obtain the output current of the stator. The position sensor and the current sensor may be configured to be electrically connected with the controller. The controller may be configured to receive the rotational speed and the output current, and may be configured to implement the method in the above-mentioned embodiments according to the received rotational speed and output current.

In some embodiments of the present disclosure, a motor stall protection apparatus is further provided. The motor stall protection apparatus may include a motor and a controller. The controller may include a control board and a power board. The control board may include a processor and a memory coupled with each other. The power board may be provided with a power module and a temperature sensor. The temperature sensor may be configured to obtain the power module temperature. The motor and the controller may be connected through a bus and realize an electronic data interaction therebetween. The processor may be configured to receive a rotational speed of the motor rotor, an output current of the motor stator and the power module temperature. The memory may be configured to store a computer program for electronic data interaction. The computer program may be configured to be implemented by the processor to realize the method in the above-mentioned embodiments.

In some embodiments of the present disclosure, a system based on the motor stall protection is further provided. The system may include an obtaining unit, a determining unit and a processing unit. The obtaining unit may be configured to obtain a rotational speed of the motor rotor, an output current of the motor stator, a power module temperature, a stall decision value, a first current accumulation value and a second current accumulation value. The determining unit may be configured to determine whether the rotational speed is less than a first rotational speed threshold, whether the output current is greater than a first current threshold, whether the rotational speed is greater than a second rotational speed threshold, whether the output current is less than a second current threshold, whether the first current accumulation value is greater than the stall decision value and whether the second current accumulation value is less than 0. The processing unit may be configured to implement one of performing the stall protection, terminating the stall protection, reducing a switching frequency of the power module, restoring the switching frequency of the power module according to a determining result of the determining unit.

In some embodiments of the present disclosure, a computer readable storage medium configured to store computer programs for electronic data interaction is further provided. The computer programs may enable the computer to implement a method as described in the above-mentioned embodiments.

The method based on the motor stall protection provided by the present disclosure may determine the timing of performing the stall protection by periodically comparing the first current accumulation value and the stall decision value. When the power module temperature is greater, the module temperature coefficient is smaller and the stall decision value is smaller. At this point, the accumulation coefficient is greater, the first step length is greater, and the time that the first current accumulation value takes to accumulate to a target decision value is shorter. Thus when the power module temperature is higher, the stall protection may rapidly take effect, thereby avoiding the damage or the burn-out of the motor. Otherwise, when the power module temperature is lower, the time that the first current accumulation value takes to accumulate to the target decision value is longer, thereby extending the time before the stall protection takes effect, thus the time before the stall protection could be fully utilized to increase the probability of being out of the stall state.

BRIEF DESCRIPTION OF THE DRAWINGS

In order to more clearly illustrate technical solutions in the present disclosure, the drawings required in the description of the embodiments will be briefly introduced below. Obviously, the drawings in the following description are only some embodiments of the present disclosure. For those of ordinary skills in the art, other drawings could be obtained based on these drawings without creative efforts.

FIG. 4 is a curve graph illustrating the variation of an accumulation coefficient according to some embodiments of the present disclosure.

FIG. 5 is a flow chart of performing the stall protection according to some embodiments of the present disclosure.

FIG. 6 is a flow chart of performing the pre-stall protection or performing the stall protection according to some other embodiments of the present disclosure.

DETAILED DESCRIPTION

Figure 1:
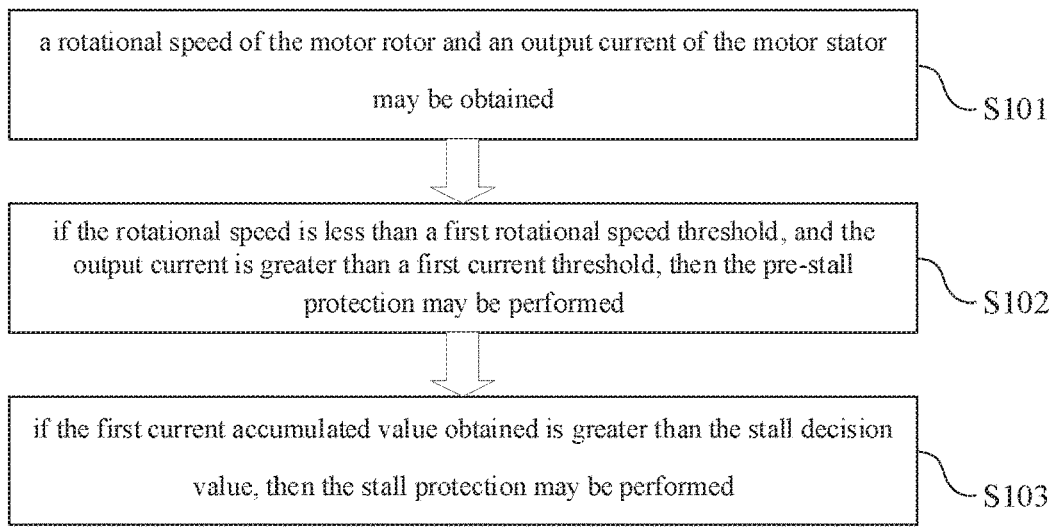
FIG. 1 is a flow chart of the motor stall protection method according to some embodiments of the present disclosure.

The present disclosure will be described in detail below in connection with the accompanying drawings and embodiments. It should be noted that, the following embodiments are only used to illustrate the present disclosure, but not to limit its scope. Similarly, the following embodiments are only a part of the embodiments of the present disclosure but not all of them. All other embodiments obtained by a person of ordinary skill in the art without creative efforts shall fall within the protection scope of the present disclosure.

Reference herein to "embodiment" means that specific features, structures, or characteristics described in connection with the embodiment may be included in at least one embodiment of the present disclosure. The appearance of the phrase in various places in the specification does not necessarily refer to the same embodiment, nor refer to an independent or alternative embodiment mutually exclusive with other embodiments. It should be appreciated by those skilled in the art explicitly and implicitly that, the embodiments described herein may be combined with other embodiments.

As is used herein, the term "motor" includes but is not limited to an apparatus that is configured to implement electrical energy conversion or transmission according to the electromagnetic induction principle. The motor may mainly serve to generate a driving torque as a power source for electrical appliances or various machines. The basic structure of the motor may usually include a stator and a rotor. A direction along which a current-carrying wire is forced to move in a magnetic field is depending both on the current direction and the magnetic direction. The basic operation principle of the motor is that, the current-carrying wire coil (that is, the stator winding) generates a rotational magnetic field. The rotational magnetic field would then act on the rotor to generate a magneto-electric dynamic rotational torque, which would cause the motor to rotate.

It should be appreciated that, there will have some disadvantages whether the time for determining performing the stall protection is too long or too short when a motor stall occurs. For example, when the time is too short, then the time before performing the stall protection may not be fully utilized. Since the motor stall malfunction may be solved within a longer time before actually performing the stall protection. As another example, if the time is too long, the motor may be damaged or burn-out before the stall protection is performed.

In light of the above-mentioned disadvantage, the applicant has found in study that, the power module temperature is dynamic during the stall process. A non-fixed stall determine time in conjunction with the power module temperature may be used to adjust the time taken to determine whether the stall protection should be performed, which would ensure that the stall protection would be performed in time, and also ensure that a too early stall protection would be avoided.

Based on the above-mentioned inventive ideas, the present disclosure may provide a method based on the motor stall protection. The method may include operations at blocks illustrated in FIG. 1.

At block S101, a rotational speed of the motor rotor and an output current of the motor stator may be obtained.

Specifically, the rotational speed of the motor rotor and the output current of the motor stator may be obtained through sensors. For example, the rotational speed of the motor rotor may be obtained by a position sensor. The three-phase current (ia, ib, ic) of the stator of the motor output terminal may be collected by a current sensor, and is then transformed and calculated to get the output current of the motor stator.

Further, the three-phase current (ia, ib, ic) may be transformed by the Calrk transformation and the Park transformation to get d-axis and q-axis current id, iq in the d-axis and q-axis rotating reference frame. The output current of the motor stator is $Is = \sqrt{id^2 + iq^2}$. The equations of the Calrk transformation and the Park transformation are:

$$\begin{bmatrix} id \\ iq \end{bmatrix} = \frac{2}{3} \begin{bmatrix} \cos\theta & \cos\left(\theta - \frac{2\pi}{3}\right) & \cos\left(\theta + \frac{2\pi}{3}\right) \\ -\sin\theta & -\sin\left(\theta - \frac{2\pi}{3}\right) & -\sin\left(\theta + \frac{2\pi}{3}\right) \end{bmatrix},$$

wherein, θ is the electrical angle of the motor.

At block S102, if the rotational speed is less than a first rotational speed threshold, and the output current is greater than a first current threshold, then the pre-stall protection may be performed. During the pre-stall protection, the power module temperature, a stall decision value and a first current accumulation value may be obtained.

Specifically, due to mechanical reasons or an excessive load, the motor rotor rotational speed is extremely low or even 0. For example, the rotational speed is lower than a rotational speed lower limit. And at the same time, the motor stator may output a larger current, for example, the output current may exceed the current upper limit. That is, the motor may output a larger torque. Then the motor may be in a stall state. It should be appreciated that, a stall marker may be set to define and identify the stall state of the motor. For example, if the stall marker is 1, the motor is in a stall state. If the stall marker is 0, then the motor is not in a stall state.

It should be appreciated that the terms "first", "second", and "third" in embodiments of the present disclosure are for descriptive purposes only, and should not be construed as indicating or implying relative importance or implicitly indicating the number of the technical features referred to. Thus, the features defined by "first", "second" and "third" may explicitly or implicitly include at least one of the said features.

Further, if the motor rotor rotational speed is less than the first rotational speed threshold, and the motor stator output current is greater than the first current threshold, then the motor may be considered to be in a stall state, and the stall marker is 1. When the motor is in the stall state, the motor may perform the pre-stall protection, and may begin to determine the timing for the stall protection of the motor to be performed.

Specifically, if the motor rotor rotational speed is less than the first rotational speed threshold, and the motor stator output current is greater than the first current threshold, the motor may perform the pre-stall protection. That is, the power module temperature, the stall decision value and the first current accumulation value may be obtained to determine the timing for the stall protection of the motor to be performed.

It should be appreciated that, the power module temperature may be obtained by the sensors. For example, the power module temperature may be obtained by a temperature sensor. The first current accumulation value may be obtained by periodically accumulating the motor stator output current at the current moment. The stall decision value may be calculated with coefficient related to the power module temperature.

At block S103, if the first current accumulation value obtained is greater than the stall decision value, then the stall protection may be performed.

Specifically, if the first current accumulation value is greater than the stall decision value, it is considered that an overheating of the motor has reached a limit value, and the stall protection for the motor may take effect to avoid the damage or burn-out of the motor.

The output current of the motor stator may periodically accumulate a first step length to obtain the first current accumulation value. The stall decision value may decrease as the power module temperature rises. The first step length may increase as the power module temperature rises.

Further, when the stall marker is 1, the first current accumulation value may begin to be periodically accumulated with the first step length given by accumulation coefficient times the output current. That is, the first current accumulation value=first current accumulation value+accumulation coefficient*output current. The accumulation coefficient may increase as the power module temperature rises. That is, the first step length may increase as the power module temperature rises.

Specifically, stall decision value=module temperature coefficient*peak current*stall time. The module temperature coefficient may decrease as the power module temperature rises. The peak current may be the maximum current that the motor could withstand. That is, when the output current of the motor exceeds the peak current, the motor may be damaged or burn-out. The stall time may be the time the power module could run normally when the motor is in the stall state, that is the limit stall time of the motor. Normally, the stall time may be the time in which the motor is allowed to run during a motor stall due to overload or mechanical reasons.

It should be appreciated that, for a same motor, its peak current and stall time are normally constant, but the stall decision value may be affected by the module temperature coefficient and may decrease as the power module temperature rises.

The method based on the motor stall protection provided by the present disclosure may determine the timing of performing the stall protection by periodically comparing the first current accumulation value and the stall decision value. When the power module temperature is greater, the module temperature coefficient is smaller and the stall decision value is smaller. At this point, the accumulation coefficient is greater, the first step length is greater, and the time that the first current accumulation value takes to accumulate to a target decision value is shorter. Thus when the power module temperature is greater, the stall protection may rapidly be performed, thereby avoiding the damage or the burn-out of the motor. Otherwise, when the power module temperature is smaller, the time that the first current accumulation value takes to accumulate to the target decision value is longer, thereby extending the time before the stall protection is performed, thus the time before the stall protection could be fully utilized and opportunity of being out of the stall condition could be further enhanced.

Figure 2:
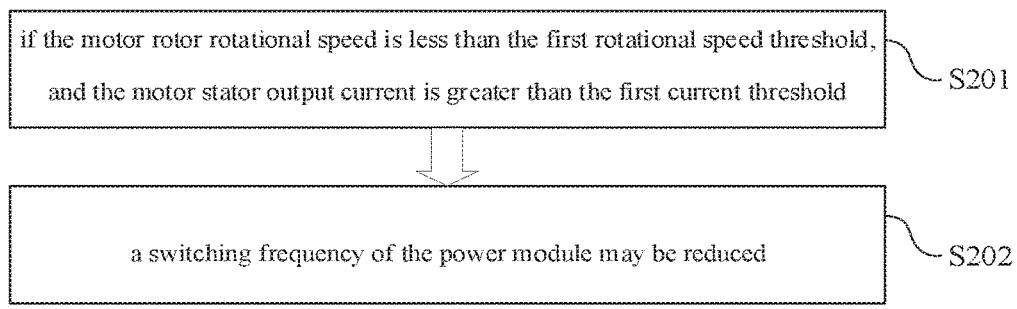
FIG. 2 is a flow chart of the motor stall protection method according to some other embodiments of the present disclosure.

In some other embodiments of the present disclosure, please referring to FIG. 2, the method based on the motor stall protection is provided. The method may generally further includes operations at blocks illustrated in FIG. 2.

At block S201, if the motor rotor rotational speed is less than the first rotational speed threshold, and the motor stator output current is greater than the first current threshold.

At block S202, a switching frequency of the power module may be reduced.

By reducing the switching frequency of the power module, the switching loss of the power module may be decreased, and heating of the power module at stall condition may be decreased. It should be appreciated that, reducing the switching frequency of the power module should guarantee the basic operation of the motor while ensuring a lower heating.

It should be appreciated that, in some embodiments of the present disclosure, obtaining the stall decision value may include obtaining the module temperature coefficient, the peak current and the stall time. The stall decision value=module temperature coefficient*peak current*stall time. Wherein, the module temperature coefficient may be inversely proportional to the power module temperature. The peak current may be the peak current of the aforementioned motor, and the stall time may be the limit stall time of the aforementioned motor.

Figure 3:
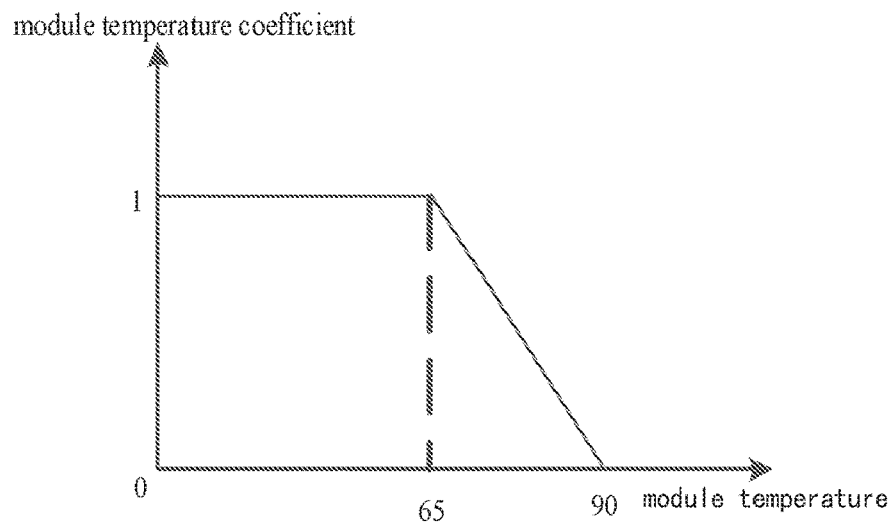
FIG. 3 is a curve graph illustrating the variation of a module temperature coefficient according to some embodiments of the present disclosure.

Specifically, please referring to FIG. 3, FIG. 3 is a curve graph showing the variation of the module temperature coefficient based on the power module temperature according to some embodiments of the present disclosure. When the power module temperature is less than 65° C., the module temperature coefficient is 1. At this point, the stall decision value is not decreased, thereby reducing the effect on a motor system. When the power module temperature is greater than 65° C., the module temperature coefficient may start to change from 1 to 0, in order to gradually reduce the stall decision value, thus shorting the time before the stall protection in a situation where the power module temperature is higher. It should be appreciated that, the transition temperature which is 65° C. here may be set according to an average temperature of the power module temperature when the motor is actually normally operating. The cut-off temperature which is 90° C. here may be set according to the heat resistance capacity of a specific power module.

Further, in some embodiment of the present disclosure, obtaining the first current accumulation value may include obtaining the accumulation coefficient, the first current accumulation value=first current accumulation value+first step length, the first step length=accumulation coefficient*output current. The initial value of the first current accumulation value may be the output current of the motor stator at the moment the motor is stalled, that is, the output current of the motor stator when the stall marker is 1.

Specifically, please referring to FIG. 4, FIG. 4 is a curve graph showing the variation of the accumulation coefficient based on the power module temperature according to some embodiments of the present disclosure. As the power module temperature rises, the accumulation coefficient may continue to increase, thereby increasing the speed of reaching the stall decision value, thus the stall protection may take effect in time, thereby reducing a risk of sample delay of the temperature sensor during the stall condition. On the contrary, when the accumulation coefficient is smaller, the time taken to perform the stall protection is longer, then the time before the stall protection may be fully utilized, thereby increasing the probability of returning to normal condition.

Further, as is shown in FIG. 4, the maximum temperature permitted by the power module is 90° C., and the corresponding accumulation coefficient for example is 2. That is, when the power module temperature is greater than 90, the first step length accumulated by the present current is doubled, and the stall protection may be performed more rapidly. It should be noted that, the accumulation coefficient here is not limited to 2, as long as the accumulation coefficient is greater than 1, the stall protection state could generally be performed more rapidly.

When the motor runs stably for a long time, the equilibrium temperature of the power module may be substantially between 60-80° C., and the corresponding accumulation coefficient for example is 1. That is, the first step length accumulated by the present current is not amplified, what is accumulated is a normal step length. Of course, in other embodiments, when the power module temperature is between 60-80° C., the accumulation coefficient may be increased or decreased, thereby lengthening or shortening the time before the stall protection is performed.

When the power module temperature is less than 30° C., the accumulation coefficient for example is 0.5. That is, the first step length accumulated by the present current is halved, thereby lengthening the stall determination time. Of course, in other embodiments, when the power module temperature is less than 30° C., the accumulation coefficient may not always be 0.5, but could be finely adjusted according to actual needs. It must be ensured that, in a case that the module temperature is less than the equilibrium temperature when the power module is stably running for a long time, the accumulation coefficient should be less than 1.

It should be appreciated that, when the power module temperature is between 30-60° C. and between 80-90° C. of the intermediate transition stage, the accumulation coefficient may not be limited to the linear transition as shown in FIG. 4, but may also be other curve transition forms such as quadratic curve transition. It should be noted that, the point and interval setting of the power module temperature may vary, and the accumulation coefficient may change as per the requirement, or the accumulation coefficient may be obtained according to a power module temperature table through looking up in the table.

In some embodiments of the present disclosure, please referring to FIG. 5, FIG. 5 is a flow chart of performing the stall protection according to some embodiments of the present disclosure. When the first current accumulation value obtained is greater than the stall decision value, the stall protection may be performed. Specifically, performing the stall protection state may include operations at blocks illustrated in FIG. 5.

At block S501, the stall protection coefficient may be obtained to produce a maximum output current magnitude of the motor. The maximum output current magnitude=stall protection coefficient*peak current.

Specifically, in the stall protection, the maximum output current magnitude of the motor gradually decreases to 0, that is, the motor may lose power to protect the motor. It should be appreciated that, a certain time needs to be passed from the time point the stall protection is performed to the time point the power is lost. This time may be set as desired to protect the motor in a desired time.

At block S502, the stall protection coefficient may change from 1 to 0 within the first preset time threshold.

Specifically, the motor could be protected within the first preset time threshold in some embodiments of the present disclosure. That is, the maximum output current magnitude may be reduced to 0, and the stall protection coefficient may change from 1 to 0 within the first preset time threshold. Further, the stall protection coefficient may be changed from 1 to 0 through a linear transition, a quadratic curve transition or other curve transition forms, which is not specifically limited in embodiments of the present disclosure.

It should be appreciated that, the first preset time threshold may be normally set between 300 ms-1.5 s, such that the motor may perform the stall protection more rapidly, thereby avoiding the damage to the motor. In some embodiments of the present disclosure, the first preset time threshold may be set as 500 ms or 1 s.

In some embodiments of the present disclosure, in the stall protection, during the process that the maximum output current magnitude of the motor gradually decreases to 0, the output current of the motor stator may become less than a current lower limit, or the rotational speed of the motor rotor may exceed the rotational speed upper limit. At this point, it may be considered that, the malfunction of the motor is cleared, and the motor may be returned to its normal operation or out of the stall protection.

In light of this, in some other embodiments of the present disclosure, please referring to FIG. 6, FIG. 6 is a flow chart of performing the pre-stall protection or the stall protection according to some embodiments of the present disclosure. Performing the pre-stall protection or performing the stall protection may include operations at blocks illustrated in FIG. 6.

At block S601, the rotational speed of the motor rotor and the output current of the motor stator may be obtained.

It should be appreciated that, this block is substantially identical to the block S101 in the aforementioned embodiment, thus is not further detailed in the present embodiment.

At block S602, if the rotational speed is greater than the second rotational speed threshold, or the output current is less than the second current threshold, then the second current accumulation value may be obtained.

Specifically, the motor usually have a minimum rotational speed and rated operating current during normal operation, which may be used to determine the operating condition of the motor.

Further, when the motor rotor rotational speed is greater than the second rotational speed threshold, or when the motor stator output current is less than the second current threshold, it may be considered that the motor has the timing for normal operation, and the pre-stall protection or the stall protection may be terminated. At this point, the timing for the motor to terminate the pre-stall protection or the stall protection may be determined by obtaining the second current accumulation value.

At block S603, if the second current accumulation value obtained is less than 0, the pre-stall protection or the stall protection may be terminated.

Specifically, when the second current accumulation value is less than 0, then the motor may be considered to be ready for normal operation, then the motor may be out of the pre-stall protection or the stall protection, and the stall marker is 0.

The output current of the motor stator may periodically and cumulatively subtract the second step length to obtain the second current accumulation value. The second step length may decrease as the power module temperature rises.

Further, the periodically and cumulatively subtraction of the second current accumulation value may be taken with the second step length given by the cumulative subtraction coefficient times the peak current. That is, the second current accumulation value=second current accumulation value−cumulative subtraction coefficient*peak current. The cumulative subtraction coefficient may decrease as the power module temperature rises. That is, the second step length may decrease as the power module temperature rises.

In some embodiments of the present disclosure, the second current accumulation value may be periodically obtained when the motor is in the pre-stall protection or in the stall protection, and may assist to determine the timing for terminating the pre-stall protection or the stall protection. When the power module temperature is higher, the cumulative subtraction coefficient may be smaller, the second step length may be smaller, the time the second current accumulation value taken to reduce to 0 may be longer. Thus when the power module temperature is higher, the time before terminating the pre-stall protection or terminating the stall protection may be extended, thus the power module temperature may be provided with sufficient cooling time. On the contrary, when the module temperature is smaller, the time the second current accumulation value taken to reduce to 0 is shorten, thus the pre-stall protection or the stall protection may be terminated more rapidly, the stall protection coefficient may be restored to 1 more rapidly, thus the motor may return to normal operation.

Further, in some embodiments of the present disclosure, obtaining the second current accumulation value may include obtaining the cumulative subtraction coefficient. The second current accumulation value=second current accumulation value−second step length, the second step length=cumulative subtraction coefficient*peak current. An initial value of the second current accumulation value may be the output current at the moment the motor performs the stall protection. The cumulative subtraction coefficient may decrease as the power module temperature rises.

Figures 7, 8:
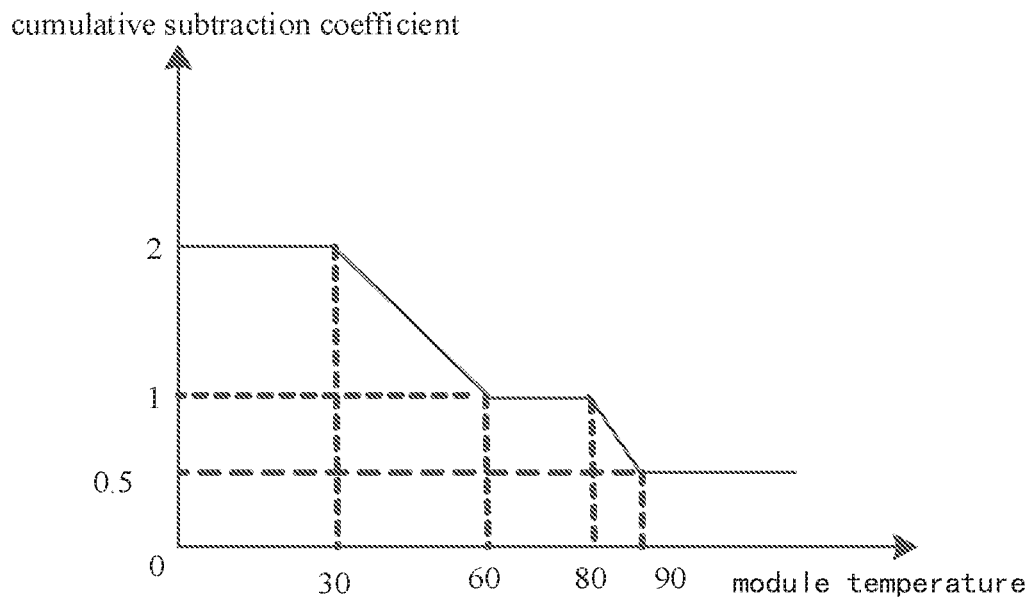
FIG. 7 is a curve graph illustrating a variation of a cumulative subtraction coefficient according to some embodiments of the present disclosure.
FIG. 8 is a flow chart of terminating the pre-stall protection or terminating the stall protection according to some embodiments of the present disclosure.

Specifically, please referring to FIG. 7, FIG. 7 is a curve graph of the variation of the cumulative subtraction coefficient based on the power module temperature according to some embodiments of the present disclosure. The cumulative subtraction coefficient may become smaller and smaller as the power module temperature gets higher and higher, thus the time before terminating the pre-stall protection or the stall protection may be extended, and the power module may be provided with longer cooling time. On the contrary, when the cumulative subtraction coefficient is larger, the pre-stall protection or the stall protection may be terminated more rapidly, thereby the normal operation of the motor may be returned as soon as possible.

Further, when the maximum temperature of the power module is greater than 90° C., the corresponding cumulative subtraction coefficient may for example be 0.5. At this point, the second step length may be halved, the time before terminating the stall protection may be extended, and the power module may be provided with longer cooling time. It should be noted that, the cumulative subtraction coefficient is not limited to 0.5 here. When the cumulative subtraction coefficient is less than 1, the time before terminating the stall protection may generally be extended.

When the motor runs stably for a long time, the equilibrium temperature of the power module may be in general between 60-80° C., and the corresponding cumulative subtraction coefficient may for example be 1. That is, the second step length is not amplified, the cumulative subtraction may be done with normal step length. Of course, in some other embodiments, when the power module is between 60-80° C., the cumulative subtraction coefficient may also be increased or decreased, thereby the time before terminating the stall protection may be extended or shorten.

When the power module temperature is less than 30° C., the cumulative subtraction coefficient may for example be 2. That is, the second step length is doubled, thus the stall protection may be terminated more rapidly. Of course, in some other embodiments, when the power module temperature is less than 30° C., the cumulative subtraction coefficient may not always be the same, but may be finely adjusted according to actual needs. It must be ensured that, if the module temperature is less than the equilibrium temperature when the power module is stably running for a long time, the accumulation coefficient should be less than 1.

In some embodiments of the present disclosure, when the motor is in the stall protection, the second current accumulation value may be periodically obtained, and may thereby assist to determine the timing for terminating the stall protection. When the power module temperature is higher, the cumulative subtraction coefficient may be smaller, the second step length may be smaller, the time the second current accumulation value taken to reduce to 0 may be longer. Thus when the power module temperature is higher, the time before terminating the stall protection may be extended, thus the power module temperature may be provided with sufficient cooling time. On the contrary, when the power module temperature is smaller, the time the second current accumulation value taken to reduce to 0 may be shorter, thus the stall protection may be terminated more rapidly, and the motor may return to normal operation as quickly as possible.

In some embodiments of the present disclosure, please referring to FIG. 8, FIG. 8 is flow chart of terminating the pre-stall protection or terminating the stall protection according to some embodiments of the present disclosure. When the second current accumulation value obtained is less than 0, the pre-stall protection or the stall protection may be terminated. Specifically, terminating the pre-stall protection or terminating the stall protection may include operation at blocks illustrated in FIG. 8.

At block S801, if the rotational speed of the motor rotor is greater than the second rotational speed threshold, or if the output current of the motor stator is less than the second current threshold.

At block S802, the switching frequency of the power module may be restored to a normal switching frequency.

The normal operation of the motor may be guaranteed by restoring the switching frequency of the power module.

At block S803, the stall protection coefficient may restore to 1 within the second preset time.

Specifically, it takes a certain time from the point determining to terminate the stall protection to the point the motor runs normally. This time is set as desired to allow the motor to run normally within a desired time.

Further, in some embodiments of the present disclosure, the motor may restore to normal operation within the second preset time, thus the stall protection coefficient must return to 1 within the second preset time threshold. At this point, the stall marker is 0, and the stall protection may be terminated. Specifically, the stall protection coefficient may restore to 1 through a linear transition restoration, a quadratic curve transition restoration or other curve transition restoration form, which is not limited in embodiments of the present disclosure.

It should be appreciated that, the second preset time threshold is usually set between 300 ms-2 s, such that the motor may restore to the normal operation more rapidly. In some embodiments of the present disclosure, the second preset time threshold may be set as 500 ms or 1 s.

Figure 9:
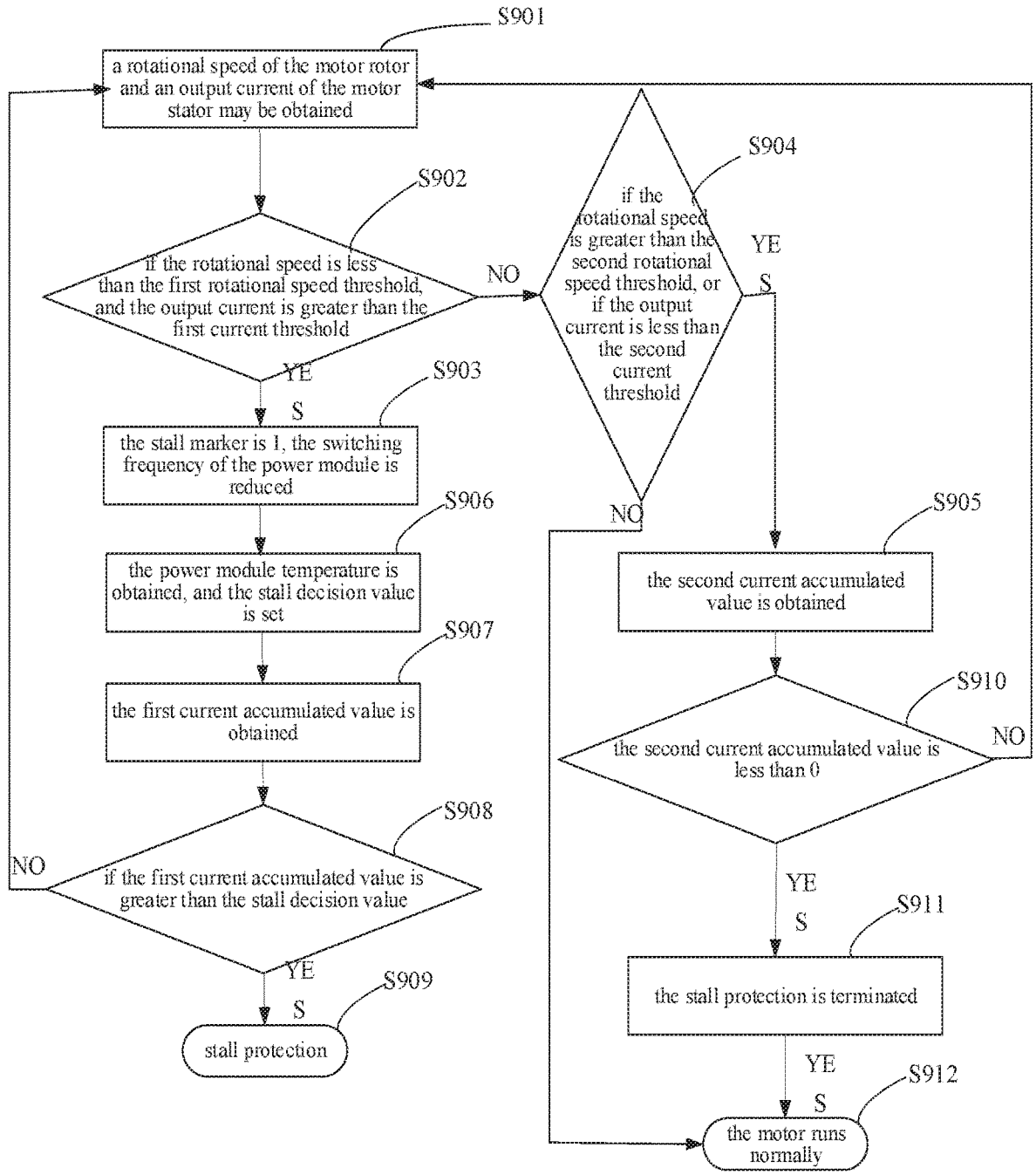
FIG. 9 is a flow chart of the motor stall protection method according to some other embodiments of the present disclosure.

Further, in some embodiments of the present disclosure, the motor may perform the stall protection or terminating the stall protection and run normally under different conditions. Specifically, please referring to FIG. 9, FIG. 9 is a flow chart of a method based on the motor stall protection according to some embodiments of the present disclosure. The method may generally include operations at blocks illustrated in FIG. 9.

At block S901, a rotational speed of the motor rotor and an output current of the motor stator may be obtained. This operation is substantially identical to operation S101 and S601 in the foregoing embodiments, thus no further description will be given in this embodiment.

At block S902, if the rotational speed is less than the first rotational speed threshold, and the output current is greater than the first current threshold, then go to block S903, else go to block S904.

At block S904, if the rotational speed is greater than the second rotational speed threshold, or if the output current is less than the second current threshold, then go to block S905, else go to block S912.

It should be appreciated that, the first rotational speed threshold is less than the second rotational speed threshold, the first current threshold is greater than the second current threshold.

At block S903, the stall marker is 1, the switching frequency of the power module is reduced, and go to block S906.

At block S906, the power module temperature is obtained, and the stall decision value is set. The stall decision value=module temperature coefficient*peak current*stall time, then go to block S907.

At block S907, the first current accumulation value is obtained, the first current accumulation value=first current accumulation value+accumulation coefficient*first step length; then go to block S908.

At block S908, if the first current accumulation value is greater than the stall decision value, performing the stall protection, that is, go to block S909. Else, return to block S901.

At block S905, the second current accumulation value is obtained, the second current accumulation value=second current accumulation value−cumulative subtraction coefficient*peak current, then go to block S910.

At block S910, if the second current accumulation value is less than 0, then the stall protection may be terminated, that is, go to block S911. Else, go to block S901.

At block S912, the motor runs normally.

It should be appreciated that, the related operations and processes involved in embodiments of the present disclosure are all somehow described in the foregoing embodiments, thus are not detailed here anymore.

In some embodiments of the present disclosure, the stall decision value may change as the module temperature coefficient changes. The higher the power module temperature is, the smaller the module temperature coefficient is, and the smaller the stall decision value is. Thus when the power module temperature is higher, the stall protection coefficient may be reduced, and the maximum output current magnitude at present is limited, thereby avoiding the damage of the power module and the motor. On the contrary, the higher the stall decision value is, the longer the time that the first current accumulation value takes to reach the target value. Thus when the power module temperature is smaller, the stall determine time may be extended, the time before the stall protection may be fully utilized, thus the probability the system is out of the stall condition and returns to the normal operation may be increased.

Figure 10:
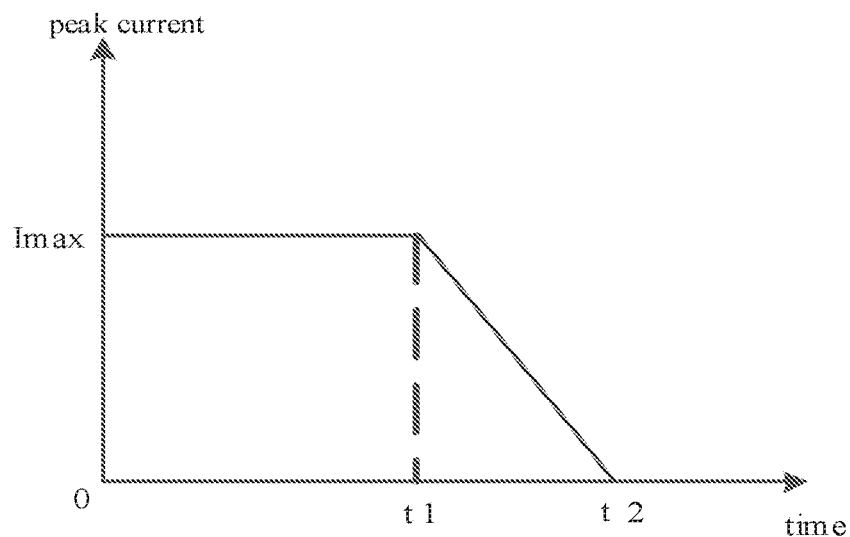
FIG. 10 is a curve graph of a variation of a peak current according to some embodiments of the present disclosure.

Further, please referring to FIG. 10, FIG. 10 is a curve graph of variation of the peak current based on the time according to some embodiments of the present disclosure. In FIG. 10, Imax is the maximum value of the peak current, t1 is the time taken to determine whether the stall protection should be performed. As for t2, when the stall protection is performed, the peak current is restricted to 0 at the time t2, and the system may lose all power. The time before t1 is the time taken to determine whether the stall protection should be performed. In this time, the peak current of the system is always the maximum value Imax, and the system is not affected. In the time between t1-t2, that is, in the first preset time threshold of the aforementioned embodiments, the stall protection is working, the peak current may gradually decrease to 0. That is, the motor loses power, and thus the motor is protected. It should be appreciated that, in different conditions of the motor, the peak current in the foregoing embodiments may substantially satisfy the curve graph shown in FIG. 10.

Figure 11:
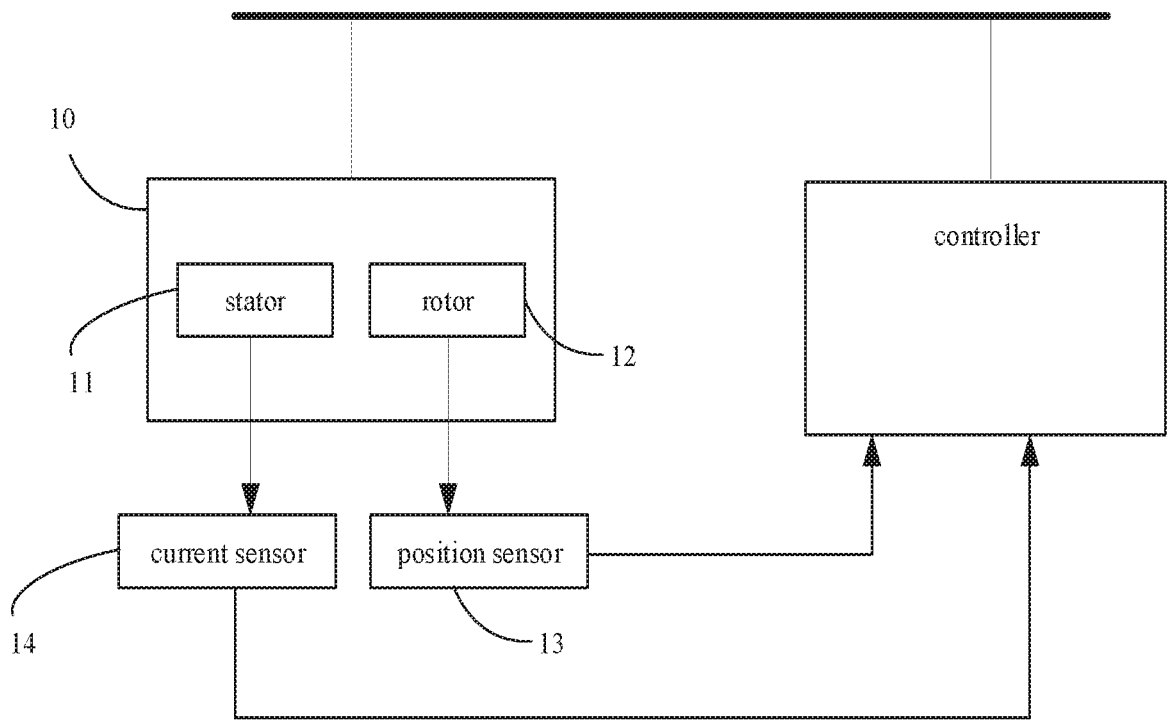
FIG. 11 is a schematic structural diagram of the motor according to some embodiments of the present disclosure.

In some embodiment of the present disclosure, a motor 10 is provided. Please referring to FIG. 11, the motor 10 may substantially include a stator 11, a rotor 12, a position sensor 13 and a current sensor 14. The position sensor 13 may be connected to the rotor 12 and obtain the rotational speed of the rotor 12. The current sensor 14 may be connected to the stator 11, and obtain the output current of the stator 11.

Further, the position sensor 13 and the current sensor 14 may be configured to be electrically connected with the controller, and realize an electronic data interaction. The controller may be configured to control the motor. For instance, the controller may control a start, an acceleration, an operation, a deceleration and a stop of the motor. Specifically, the controller may be configured to receive the rotational speed collected by the position sensor 13 and the output current collected by the current sensor 14, and further is used to implement the method in the above-mentioned embodiments according said rotational speed and output current.

The motor provided in some embodiments of the present disclosure may obtain the rotational speed of the motor rotor through the position sensor, and may obtain the output current of the motor stator through the current sensor. The obtained rotational speed and output current may then be transmitted to the controller connecting to the motor. The controller may implement the method based on the motor stall protection according to the above-mentioned embodiments depending on the received rotational speed and output current.

Figure 12:
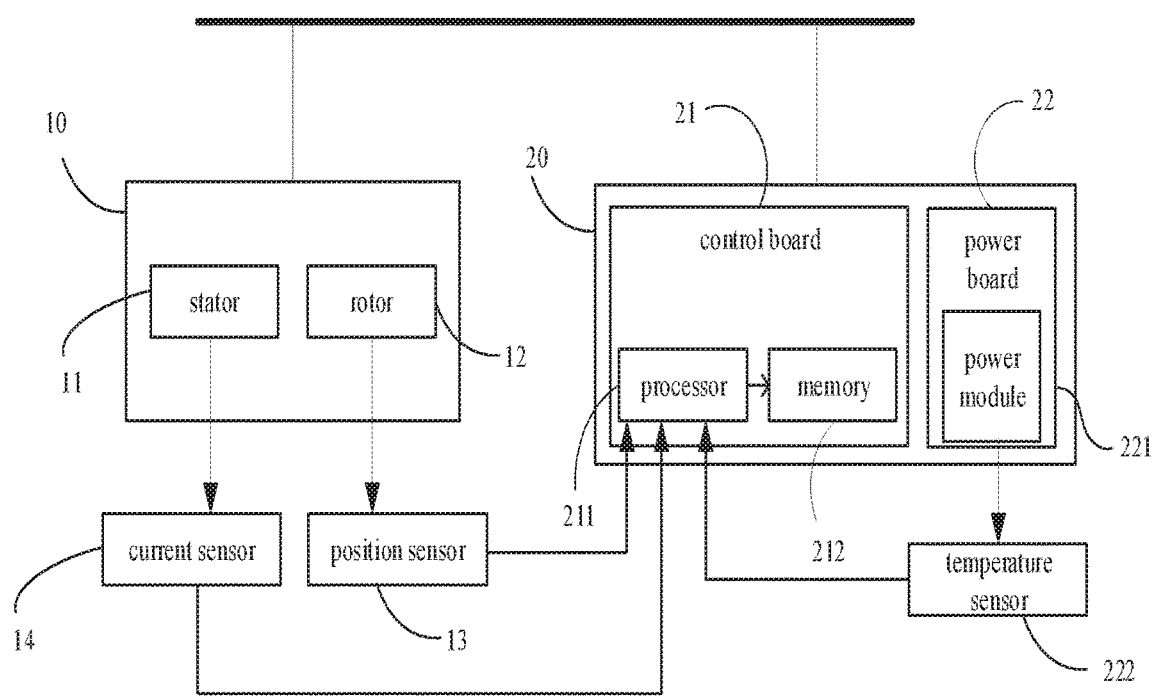
FIG. 12 is a schematic structural diagram of a motor stall protection apparatus according to some embodiments of the present disclosure.

In some embodiments of the present disclosure, a motor stall protection apparatus 100 is further provided. Please referring to FIG. 12, the apparatus 100 may substantially include a motor 10 and a controller 20. The motor 10 is the motor 10 referred in the aforementioned embodiments, thus the specific structure of the motor 10 will not be detailed below in the present embodiment.

Further, the controller 20 may substantially include a control board 21 and a power board 22. The control board 21 may substantially include a processor 211 and a memory 212 coupled together. The power board 22 may be provided with a power module 221 and a temperature sensor 222. The temperature sensor 222 may be configured to obtain the temperature of the power module 221. It should be appreciated that, the power module 221 may obtain the power module temperature through a temperature sensor 222. That is, the power module temperature may be obtained through the temperature sensor 222.

Further, the motor 10 and the controller 20 may be connected through a bus, to realize the electronic data interaction and the motor control. Specifically, the processor 211 may be configured to receive a rotational speed of the motor rotor, an output current of the motor stator and the power module temperature. The processor 221 may be further used to implement the method in the above-mentioned embodiments. The memory 212 may be configured to store computer programs for the electronic data interaction. The computer programs may be configured to be executed by the processor 211 to implement the method in the above-mentioned embodiments.

Figure 13:
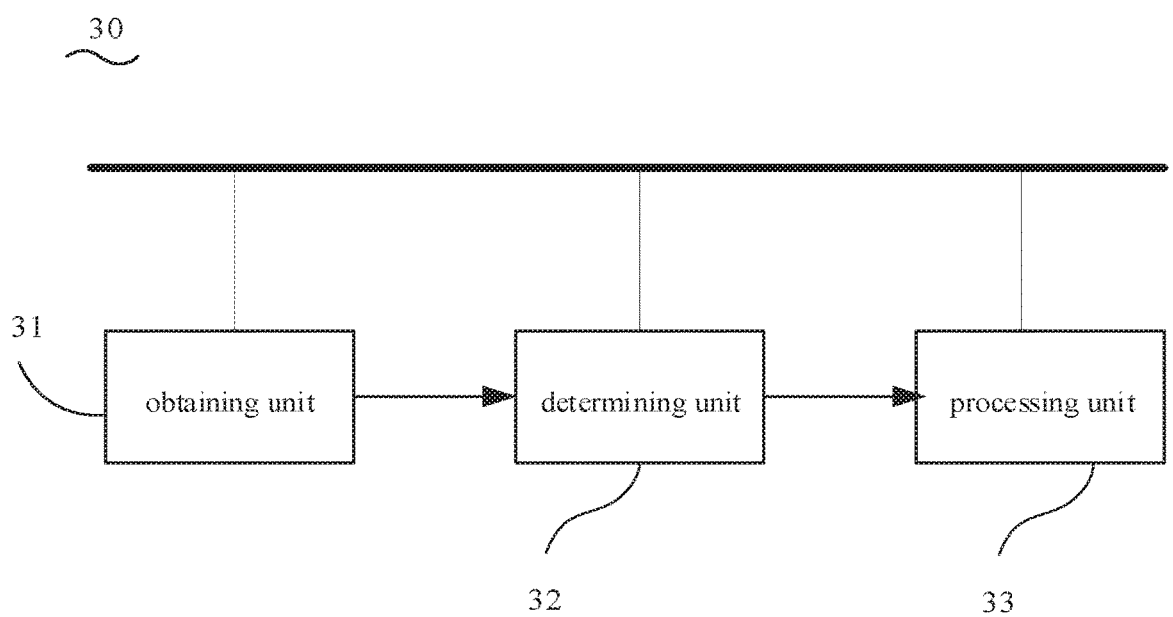
FIG. 13 is a schematic structural diagram of the motor stall protection system according to some embodiments of the present disclosure.

In some embodiments of the present disclosure, a system based on motor stall protection may be further provided. Please referring to FIG. 13, the system 30 may generally include an obtaining unit 31, a determining unit 32 and a processing unit 33.

The obtaining unit 31 may be configured to obtain the rotational speed of the motor rotor, the output current of the motor stator, the power module temperature, the stall decision value, the first current accumulation value and the second current accumulation value.

The determining unit 32 may be configured to determine whether the rotational speed is less than the first rotational speed threshold, whether the output current is greater than the first current threshold, whether the rotational speed is greater than the second rotational speed threshold, whether the output current is less than the second current threshold, whether the first current accumulation value is greater than the stall decision value and whether the second current accumulation value is less than 0.

The processing unit 33 may be configured to performing one or more operations of performing the stall protection, terminating the stall protection, reducing the switching frequency of the power module, restoring the switching frequency of the power module according to the determining result of the determining unit 32.

It should be appreciated that, the obtaining unit 31, the determining unit 32 and the processing unit 33 in some embodiments of the present disclosure may be corresponding to the relevant operations in the aforementioned method embodiments. Those skilled in the art may realize corresponding functions in the aforementioned method embodiments with the system according to embodiments of the present disclosure.

In some embodiments of the present disclosure, a computer readable storage medium is provided. The computer readable storage medium may be configured to store computer programs for electronic data interaction. The computer program may enable the computer to perform part of or all operations of any of the methods described in the above-mentioned method embodiments. It should be appreciated that, the above-mentioned computer may include electrical apparatus.

In the above embodiments, the description of each embodiment has its own emphasis. One part that is not detailed in an embodiment may be referred to related descriptions in other embodiments.

Those of ordinary skills in the art may appreciate that all or part of the operations in the various methods of the foregoing embodiments may be implemented by relevant hardware instructed by programs, and the programs may be stored in a computer readable storage medium. The computer readable storage medium may include: a U disk, a Read-Only Memory (ROM), a Random Access Memory (RAM), a magnetic disk or an optical disk.

It should be appreciated that, the foregoing embodiments may be implemented in whole or in part by software, hardware, firmware or any combination thereof. When the foregoing embodiments are implemented in whole or in part in the form of computer program products, the computer program product may include one or more computer instructions. The computer may be a general-purpose computer, a dedicated computer, a computer network, or other programmable apparatuses. Computer instructions may be stored in a computer-readable storage medium or be transmitted from one computer readable storage medium to another. The computer readable storage medium may be any available medium that can be accessed by the computer or a data storage apparatus including a server, a data center and the like integrated with one or more available media. The available media may be a magnetic media (e.g., floppy disk, hard disk, magnetic tape), optical media (e.g., DVD) or semiconductor media (e.g., Solid State Disk (SSD)) and the like.

It should be noted that, the terms 'include' and 'comprise' and any variations of them are intended to cover nonexclusive inclusions. For example, processes, methods, systems, products, or apparatuses that include a series of operations or units is not limited to the listed operations or units, but optionally include operations or units that are not listed, or optionally further include other operations or units inherent to these processes, methods, products or apparatuses.

The above are only part of the implementations of the present disclosure, and do not limit the patent scope of the present disclosure. Any equivalent changes to the apparatuses or processes made by the description and drawings of this application or directly or indirectly used in other related technical field are included in the protection scope of this application.

What is claimed is:

1. A method based on a motor stall protection, comprising:
   obtaining a rotational speed of a motor rotor and an output current of a motor stator;
   performing a pre-stall protection in response to the rotational speed being less than a first rotational speed threshold and the output current being greater than a first current threshold, wherein the performing the pre-stall protection comprises obtaining a power module temperature, a stall decision value and a first current accumulation value;
   performing the stall protection in response to the first current accumulation value obtained being greater than the stall decision value;
   wherein the output current periodically accumulates a first step length to obtain the first current accumulation value; the stall decision value decreases as the power module temperature rises, the first step length increases as the power module temperature rises.

2. The method according to claim 1, further comprising:
   reducing a switching frequency of the power module in response to the rotational speed being less than a first rotational speed threshold and the output current being greater than a first current threshold.

3. The method according to claim 1, wherein the obtaining the stall decision value comprises obtaining a module temperature coefficient, a peak current and a stall time, the module temperature coefficient is inversely proportional to the power module temperature, the peak current is the peak current of the motor, the stall time is a limit stall time of the motor; wherein, the stall decision value is the product of the module temperature coefficient, the peak current and the stall time.

4. The method according to claim 1, wherein the obtaining the first current accumulation value comprises obtaining an accumulation coefficient, the accumulation coefficient increases as the power module temperature rises; wherein, the first step length is a product of the accumulation coefficient and the output current, the first current accumulation value is updated by adding the first step length.

5. The method according to claim 1, wherein the performing the stall protection comprises: obtaining the stall protection coefficient to produce a maximum output current magnitude of the motor, the maximum output current magnitude is a product of the stall protection coefficient and the peak current; the stall protection coefficient changes from 1 to 0 within the first preset time threshold.

6. The method according to claim 1, wherein the performing the pre-stall protection or performing the stall protection further comprises:
   obtaining the rotational speed of the motor rotor and the output current of the motor stator;
   obtaining a second current accumulation value in response to the rotational speed being greater than a second rotational speed threshold, or the output current being less than a second current threshold;
   terminating the pre-stall protection or the stall protection in response to the second current accumulation value obtained being less than 0;
   wherein, the output current periodically and cumulatively subtracted a second step length to obtain the second current accumulation value; the second step length decreases as the power module temperature rises.

7. The method according to claim 6, wherein the obtaining the second current accumulation value comprises obtaining a cumulative subtraction coefficient, the cumulative subtraction coefficient decreases as the power module temperature rises; wherein, the second current accumulation value is updated by subtracting the second step length therefrom, the second step length is a product of the cumulative subtraction coefficient and the peak current.

8. The method according to claim 6, wherein the terminating the pre-stall protection or the stall protection comprises: restoring a switching frequency of the power module to a normal switching frequency.

9. The method according to claim 6, wherein the terminating the stall protection comprises: restoring the stall protection coefficient to 1 within a second preset time threshold.

10. The method according to claim 1, wherein the rotational speed is obtained through a position sensor, the output current is obtained through a current sensor, and the power module temperature is obtained through a temperature sensor.

11. A motor stall protection apparatus, comprising a motor and a controller, the controller comprises a control board and a power board; the control board comprises a processor and a memory coupled to each other, the power board is provided with a power module and a temperature sensor, the temperature sensor is configured to obtain a power module temperature;
   the motor and the controller are connected through a bus and realize an electronic data interaction therebetween;
   the processor is configured to receive a rotational speed of a motor rotor, an output current of a motor stator and the power module temperature, the memory is configured to store a computer program for the electronic data interaction, wherein the computer program is configured to be executed by the processor to implement a method based on a motor stall protection,
   wherein the method comprises:
      obtaining the rotational speed of the motor rotor and the output current of the motor stator;
      performing a pre-stall protection in response to the rotational speed being less than a first rotational speed threshold and the output current being greater than a first current threshold, wherein the performing the pre-stall protection comprises obtaining the power module temperature, a stall decision value and a first current accumulation value; and
      performing the stall protection in response to the first current accumulation value obtained being greater than the stall decision value;
      wherein the output current periodically accumulates a first step length to obtain the first current accumulation value; the stall decision value decreases as the power module temperature rises, the first step length increases as the power module temperature rises.

12. The motor stall protection apparatus according to claim 11, wherein the motor comprises the motor stator, the motor rotor, a position sensor and a current sensor, the position sensor is connected to the motor rotor and obtains the rotational speed of the motor rotor, the current sensor is connected to the motor stator and obtains the output current of the motor stator;

the position sensor and the current sensor are configured to be electrically connected with the controller.

13. The motor stall protection apparatus according to claim 12, wherein the method further comprises:

reducing a switching frequency of the power module in response to the rotational speed being less than a first rotational speed threshold and the output current being greater than a first current threshold.

14. The motor stall protection apparatus according to claim 12, wherein the obtaining the stall decision value comprises obtaining a module temperature coefficient, a peak current and a stall time, the module temperature coefficient is inversely proportional to the power module temperature, the peak current is the peak current of the motor, the stall time is a limit stall time of the motor; wherein, the stall decision value is the product of the module temperature coefficient, the peak current and the stall time.

15. The motor stall protection apparatus according to claim 12, wherein the obtaining the first current accumulation value comprises obtaining the accumulation coefficient, the accumulation coefficient increases as the power module temperature rises; wherein, the first step length is a product of the accumulation coefficient and the output current, the first current accumulation value is updated by adding the first step length.

16. The motor stall protection apparatus according to claim 12, wherein the performing the stall protection comprises:

obtaining the stall protection coefficient to produce a maximum output current magnitude of the motor, the maximum output current magnitude is a product of the stall protection coefficient and the peak current; the stall protection coefficient changes from 1 to 0 within the first preset time threshold.

17. The motor stall protection apparatus according to claim 12, wherein the performing the pre-stall protection or performing the stall protection further comprises:

obtaining the rotational speed of the motor rotor and the output current of the motor stator;

obtaining a second current accumulation value in response to the rotational speed being greater than a second rotational speed threshold, or the output current being less than a second current threshold;

terminating the pre-stall protection or the stall protection in response to the second current accumulation value obtained being less than 0;

wherein, the output current periodically and cumulatively subtracted a second step length to obtain the second current accumulation value; the second step length decreases as the power module temperature rises.

18. The motor stall protection apparatus according to claim 17, wherein the obtaining the second current accumulation value comprises obtaining a cumulative subtraction coefficient, the cumulative subtraction coefficient decreases as the power module temperature rises; wherein, the second current accumulation value is updated by subtracting the second step length therefrom, the second step length is a product of the cumulative subtraction coefficient and the peak current.

19. The motor stall protection apparatus according to claim 17, wherein the terminating the pre-stall protection or the stall protection comprises:

restoring a switching frequency of the power module to a normal switching frequency.

* * * * *